Nov. 15, 1932.  E. F. NELSON  1,888,048

TREATMENT OF HYDROCARBON OILS

Filed Oct. 22, 1930

Witness:
Stephen T. Rebora

Inventor:
Edwin F. Nelson
By Frank L. Belknap
Atty.

Patented Nov. 15, 1932

1,888,048

UNITED STATES PATENT OFFICE

EDWIN F. NELSON, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

TREATMENT OF HYDROCARBON OILS

Application filed October 22, 1930. Serial No. 490,472.

This invention relates to improvements in the treatment of hydrocarbon oils, and more specifically to an improved method and means for the fractional distillation of hydrocarbon oils.

The utility, objects and advantages of my invention will be more apparent from the accompanying drawing and following detailed description.

Figure 1:
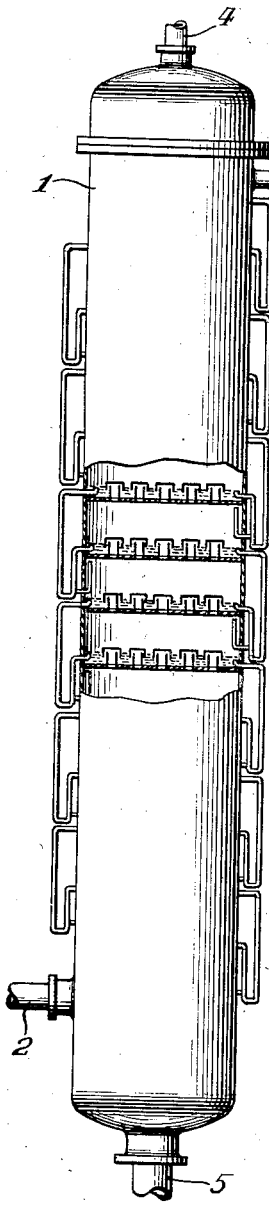

In the drawing, Fig. 1 is a vertical elevational view of a vessel provided with apparatus suitable for carrying out my invention.

Figure 2:
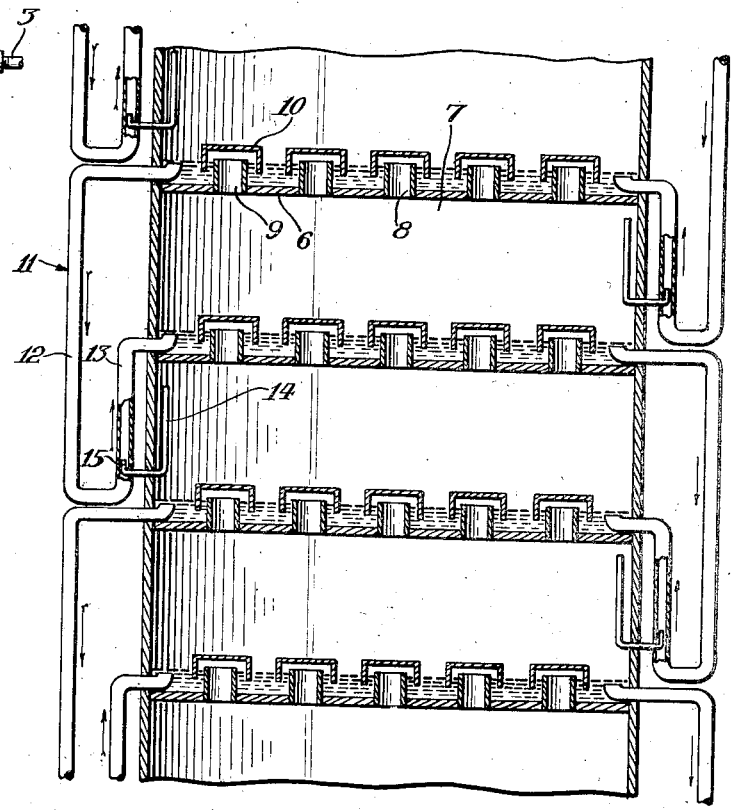

Fig. 2 is a fragmentary detail sectional elevation of a portion of the vessel shown in Fig. 1.

Referring in detail to the drawing, 1 indicates a vessel which may be utilized to intimately associate vapor and a liquid. Such vessels are used for various purposes, among which may be mentioned the cooling of vapors passing from a cracking plant and the simultaneous heating of charging stock for said plant. It is to be understood, of course, that my invention is not to be limited to this specific use inasmuch as it may be used for many other purposes.

The vessel 1 may be provided with a vapor inlet 2 and a cooling liquid inlet 3. A vapor outlet 4 may be provided at its upper end and a liquid or condensate outlet 5 may be provided at its bottom.

In utilizing a vessel or tower of this type the vapors introduced through the inlet 2 are usually introduced at a superatmospheric pressure and are passed upwardly through said tower to the vapor outlet 4. Said tower may be provided internally with a plurality of trays or partitions 6 which may divide the tower vertically into a plurality of compartments 7. Each of the trays 6 is provided with a plurality of apertures 8 having upwardly extending cylindrical defining edges 9. Each of said cylindrical members 9 may be disposed beneath an inverted cup-like member 10, the lower edges of which extend below the upper surface of the members 9.

Usually vessels of this character are provided with pipes or conduits which connect adjacent compartments. Hence, liquid introduced through the liquid inlet pipe 3 may discharge to the upper section of the vessel 1 and said liquid may be carried downwardly through each of the sections 7 through said pipes. It is desirable in order to obtain ideal association of the vapors and liquid within said vessel that the liquid within each section or upon each tray 6 be maintained at a fixed level. To accomplish this purpose the inlet openings of said compartment connecting the pipes and the discharge openings thereof may be maintained a fixed distance above the surface of each of the trays 6. Consequently when the liquid upon the upper tray 6 tends to raise in level above the inlet of one of said pipes said liquid will travel downwardly through said pipe to the next lower section.

It frequently happens inasmuch as the vapors introduced through the vapor inlet 2 are introduced at superatmospheric pressure that the pressure upon the lowermost sections is substantially greater than the pressure upon the uppermost sections, and when the vapors are being introduced at a relatively high velocity the pressure differential between adjacent sections will be so great as to cause the liquid descending from an upper section to the lower section to back up and thereby flood the section above. This condition continues until the section into which the liquid inlet 3 discharges completely fills, whereupon instead of vapors being taken off through the vapor outlet 4 both vapors and liquid will pass through said vapor outlet. This is known in the art as "puking". It can readily be seen that when this condition exists the vapors which are supposed to represent the final product of the cracking reaction will also contain impurities, inasmuch as said vapors will be mixed directly with raw charging stock.

My invention is accordingly specifically directed to the elimination of this back-up of liquid from one section to the next adjacent section, and I accomplish the same by providing a U-shaped pipe or conduit 11, one end of which is disposed in an upper section and the other end of which is disposed in the next lower section. One leg 12 of the U pipe 11, that is, the leg through which the liquid from the upper section descends, may be substantially longer than its opposite leg and may extend from said upper section downwardly adjacent the second section below. The opposite leg 13 may extend upwardly from this point to a position within the section thereabove. A pipe 14 may connect one of the compartments 7 to the leg 13, and vapors within said compartment may be passed through said pipe and into the leg 13. The outlet 15 of said pipe may be disposed upwardly within leg 13 and may discharge vapors upwardly within said leg. In this manner the upward passage of vapors at relatively high velocity will induce an upward flow of fluid through the leg 13. In addition, said vapors will intermingle with the liquid flowing within said leg and will aerate the same.

It can readily be seen that the downward passage of liquid from one section to the next lower section will not be dependent solely upon gravity, and inasmuch as the pressure within the sections 7 increases toward the bottom of the vessel 1 the downward passage of the liquid from one section to the next lower section will be assisted by the greater vapor pressure of a lower section, and hence the passage of said liquid will be facilitated. In this manner a constant liquid level will be maintained upon each of the trays 6 regardless of the rate or velocity of passage of vapors through the vapor inlet 2. Hence, undesirable overflowing of the uppermost section into the vapor outlet line will be eliminated.

I claim as my invention:

1. In a method of intimately associating liquid and vapors, which comprises passing liquid downardly through a plurality of zones in each of which a fixed liquid level is maintained, and passing vapors under pressure upwardly through said plurality of zones, the step of facilitating the passage of liquid from one zone to the zone next below by passing a stream of vapors at relatively high velocity from a zone of relatively high pressure into the liquid passing from said upper zone to said lower zone.

2. In combination, a bubble tower having an inlet for vapors and an inlet for cooling liquid, a plurality of superimposed trays in said tower, means for passing vapors upwardly through said trays and means for passing liquid downwardly from one tray to the next lower tray, which comprises an open ended U-shaped conduit, the inlet of said pipe being disposed adjacent the level of the liquid on one tray and the outlet of said pipe being disposed adjacent the level of the liquid upon the next lower tray, and means for introducing vapors into said conduit to assist the flow of liquid therethrough.

3. In combination, a bubble tower having an inlet for vapors and an inlet for cooling liquid, a plurality of superimposed trays in said tower, means for passing vapors upwardly through said trays and means for passing liquid downwardly from one tray to the next lower tray, which comprises an open ended U-shaped conduit, the inlet of said pipe being disposed adjacent the level of the liquid on one tray and the outlet of said pipe being disposed adjacent the level of liquid upon the next lower tray, and means for passing vapors under pressure into the discharge leg of the U-shaped conduit to induce the flow of liquid therethrough.

4. In combination, a bubble tower having a plurality of superimposed perforated trays dividing said tower into a plurality of compartments, means for passing vapors upwardly through said compartments, means for passing liquid downwardly from tray to tray comprising a U-shaped conduit having ends opening adjacent said trays, and means for assisting the flow of liquid through said conduit by means of vapors.

5. In combination, a bubble tower having a plurality of superimposed perforated trays dividing said tower into a plurality of compartments, means for passing vapors upwardly through said compartments, means for passing liquid downwardly from tray to tray comprising a U-shaped conduit having ends opening adjacent said trays, and a pipe connected into the discharge leg of the U-shaped conduit, said pipe discharging vapor from a compartment of relatively high pressure into said U-shaped conduit inducing the flow of liquid from the upper tray to the lower tray.

6. In combination, a bubble tower, means dividing the tower into vertically arranged compartments, means for passing vapors upwardly through the compartments, a conduit for passing liquid from an upper compartment to a lower compartment, and means for introducing vapors into said conduit to assist the flow of liquid therethrough.

7. In combination, a bubble tower, means dividing the tower into vertically arranged compartments, a conduit for passing vapors upwardly through the compartments, a conduit for passing liquid from an upper compartment to a lower compartment, and means for introducing vapors from a still lower compartment into said conduit to assist the flow of liquid therethrough.

8. In a method of intimately associating liquid and vapors wherein the vapors are passed upwardly and the liquid is passed downwardly through vertically arranged contacting zones, the improvement which comprises facilitating the flow of liquid from an upper zone to a lower zone by introducing vapors at relatively high velocity into the liquid flowing from the upper zone to the lower zone, such vapors being introduced in the direction of liquid flow.

9. In a method of intimately associating liquid and vapors wherein the vapors are passed upwardly and the liquid is passed downwardly through vertically arranged contacting zones, the improvement which comprises facilitating the flow of liquid from an upper zone to a lower zone by introducing vapors at relatively high velocity into the liquid flowing from the upper zone to the lower zone, such vapors being introduced in the direction of liquid flow and being taken from a still lower zone.

In testimony whereof I affix my signature.

EDWIN F. NELSON.